(12) United States Patent
Su

(10) Patent No.: US 9,403,546 B1
(45) Date of Patent: Aug. 2, 2016

(54) FOLDING STRUCTURE FOR TROLLEY

(71) Applicant: Chung-Shiu Su, Kaohsiung (TW)

(72) Inventor: Chung-Shiu Su, Kaohsiung (TW)

( * ) Notice: Subject to any disclaimer, the term of this patent is extended or adjusted under 35 U.S.C. 154(b) by 0 days.

(21) Appl. No.: 14/721,072

(22) Filed: May 26, 2015

(51) Int. Cl.
*A45C 7/00* (2006.01)
*B62B 1/12* (2006.01)
*A45C 13/26* (2006.01)

(52) U.S. Cl.
CPC ................. *B62B 1/12* (2013.01); *A45C 13/262* (2013.01)

(58) Field of Classification Search
CPC ............... A45C 13/262; A45C 13/385; A45C 2013/267; Y10T 16/451; B62B 1/125
See application file for complete search history.

(56) References Cited

U.S. PATENT DOCUMENTS

| | | | | |
|---|---|---|---|---|
| 5,502,876 A * | 4/1996 | Wang | ........... | A45C 13/262 16/113.1 |
| 5,515,576 A * | 5/1996 | Tsai | ........... | A45C 13/262 16/113.1 |
| 5,526,908 A * | 6/1996 | Wang | ........... | A45C 13/262 16/113.1 |
| 5,581,846 A * | 12/1996 | Wang | ........... | A45C 13/262 16/113.1 |
| 5,639,109 A * | 6/1997 | Liang | ........... | A45C 13/262 16/113.1 |
| 5,692,266 A * | 12/1997 | Tsai | ........... | A45C 13/262 16/113.1 |
| 5,694,663 A * | 12/1997 | Tserng | ........... | A45C 13/262 16/113.1 |
| 5,803,214 A * | 9/1998 | Wang | ........... | A45C 13/262 16/405 |
| 5,806,142 A * | 9/1998 | Wang | ........... | A45C 13/262 16/405 |
| 5,810,132 A * | 9/1998 | Chang | ........... | A45C 13/262 16/405 |
| 5,864,921 A * | 2/1999 | Chou | ........... | A45C 13/262 16/405 |
| 5,884,362 A * | 3/1999 | Tsai | ........... | A45C 13/262 16/113.1 |
| 5,951,037 A * | 9/1999 | Hsieh | ........... | B62B 1/125 280/47.29 |
| 5,956,807 A * | 9/1999 | Kuo | ........... | A45C 13/262 16/113.1 |
| 6,003,884 A * | 12/1999 | Chang | ........... | A45C 13/385 280/47.24 |
| 6,012,729 A * | 1/2000 | Lin | ........... | B62B 1/125 280/37 |
| 6,061,871 A * | 5/2000 | Wang | ........... | A45C 13/262 16/113.1 |
| 6,223,391 B1 * | 5/2001 | Kuo | ........... | A45C 13/262 16/113.1 |
| 6,247,203 B1 * | 6/2001 | Kuo | ........... | A45C 13/262 16/113.1 |
| 6,374,457 B1 * | 4/2002 | Kuo | ........... | A45C 13/262 16/113.1 |
| 6,550,102 B1 * | 4/2003 | Liang | ........... | A45C 13/262 16/113.1 |
| 6,832,670 B2 * | 12/2004 | Wolters | ........... | A45C 9/00 190/115 |
| 6,964,420 B1 * | 11/2005 | Ghanizadeh | ........... | A45C 5/143 190/110 |
| 7,143,912 B2 * | 12/2006 | Caneba | ........... | A45C 13/262 224/153 |
| 8,474,098 B1 * | 7/2013 | Yang | ........... | A45C 13/262 16/113.1 |
| 8,726,464 B1 * | 5/2014 | Tong | ........... | A45C 13/262 16/113.1 |
| 2002/0070087 A1 * | 6/2002 | Lee | ........... | A45C 13/262 190/115 |

* cited by examiner

*Primary Examiner* — Brodie Follman
(74) *Attorney, Agent, or Firm* — Rosenberg, Klein & Lee

(57) ABSTRACT

A folding structure for a trolley includes at least two main poles and a movable member. The main poles are connected to a carrying platform having an operating rod, two roller sets, and a base that are motionally linked. A transverse plate is attached to upper ends of the main poles. The movable member is slidably mounted on the main poles and has a pull rod. The pull rod extends beyond the transverse plate for an extension distance. To prepare the trolley for use, the operating rod is pushed downward so that the roller sets expand in a horizontal direction and the base is laid down. Then the pull rod is set for its largest extension distance to facilitate a user's pulling trolley. After use, the trolley can be easily folded by lifting the operating rod that in turn drives the roller sets and the base to retract.

7 Claims, 10 Drawing Sheets

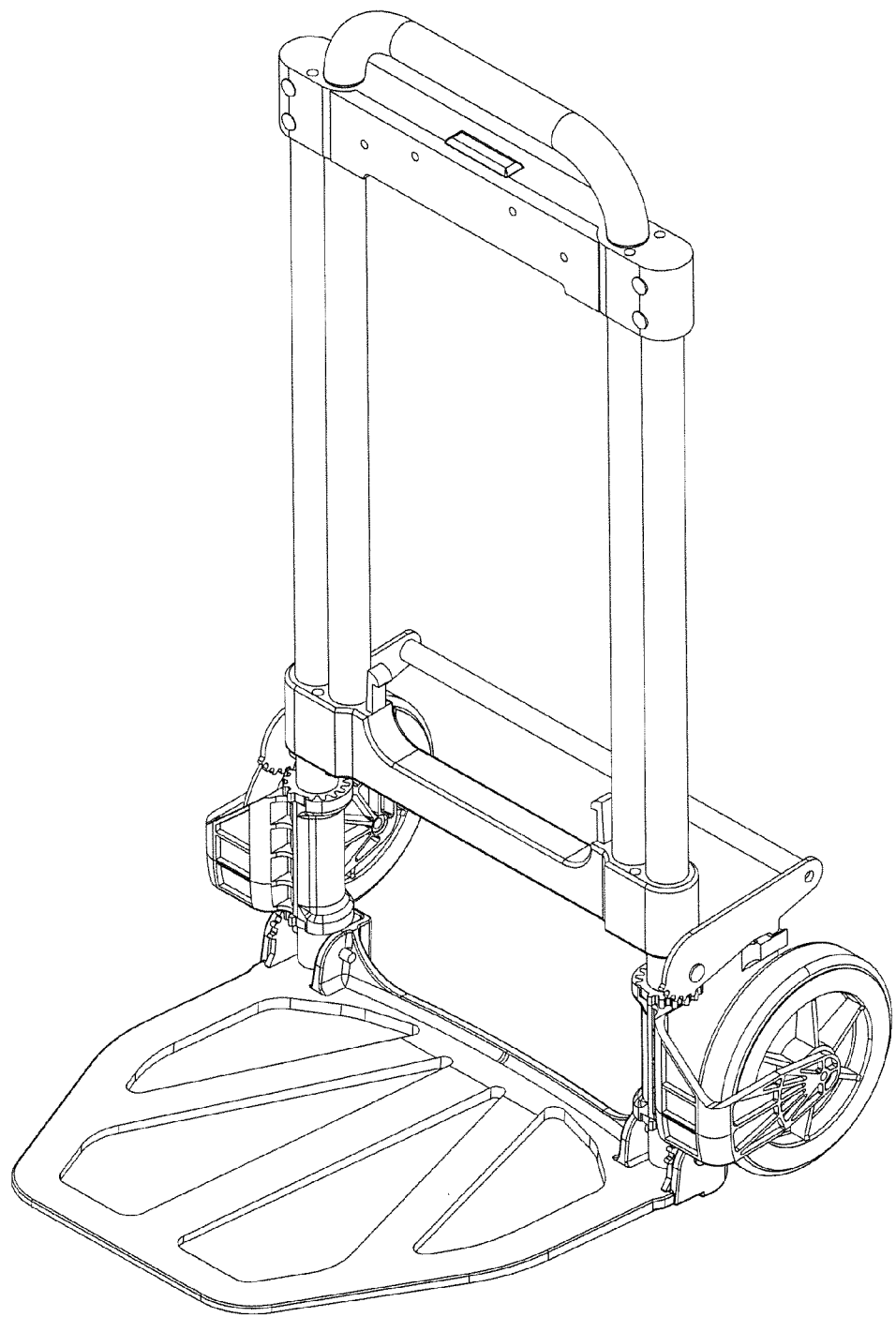
F I G . 6

1

FOLDING STRUCTURE FOR TROLLEY

BACKGROUND OF THE INVENTION

1. Technical Field

The present invention relates to trolleys, and more particularly to a folding structure for a trolley, which has an extendable pull rod so as to allow its user to operate the trolley at a proper height.

2. Description of Related Art

Trolleys are handy handling tools widely used in many public places. The conventional trolleys are generally in the form of a two-wheel cart for carrying articles or luggage. Since the places where trolleys used typically have even ground, the trolleys can be easily moved around.

The inventor of the present invention has made many prior inventions about trolleys (e.g. Taiwan Patent Nos. M274293 and 383037). Most of them are focused on the folding structure of trolleys. In addition to the folding structure, what is also important is height adjustment of a trolley's pull rod because only when the height of the pull rod corresponds to a standing user's height, the trolley can be moved smoothly while the user is walking. However, a pull rod with the height facilitating trolley's operation is usually high and less foldable. For addressing this problem. Taiwan Patent No. 360167 discloses a trolley, which has a pair of extension rods provided with an operation button at a proper position. By pressing the operation button, bolts on two links are retracted or expanded to allow inner tubes to move inside the corresponding outer tubes to a proper height and then engage with the bolts. Thereby, the trolley in use can have a proper height that facilitates a user's operation, and can have the height minimized when not in use.

However, the structure for expanding and retracting the pull rod disclosed in the prior patent (i.e. Taiwan Patent No. 360167) is complicated, which may cause difficulty in its assembly and higher manufacturing costs.

SUMMARY OF THE INVENTION

As an improvement of the aforesaid prior arts, the disclosed folding structure for a trolley comprises at least two main poles and a movable member. The at least two main poles are spaced apart from each other by a preset distance, wherein a carrying platform and a transverse plate are separately mounted with the two main poles; and the transverse plate is provided with a pressing block, two retaining blocks, and a spring member, in which the pressing block has a receiving groove, the two retaining blocks each have one end provided with a ramp portion in contact with a respective one of two lateral sides of the receiving groove, and the spring member accumulates or releases an elastic potential energy in response to relative movement among the pressing block and the two retaining blocks. The movable member is located below the transverse plate and is slidably mounted around the two main poles, wherein the movable member has two hooks extending therefrom and being configured to engage with the two retaining blocks; the movable member has a pull rod extending through the transverse plate and having a portion going beyond the transverse plate; and the portion of the pull rod that goes beyond the transverse plate has a length defined as an extension distance. When the two hooks of the movable member each engage with a respective one of the two retaining blocks, the extension distance is at its maximum; in this condition, while being applied with an external force, the pressing block presses against the ramp portions of the two retaining blocks so that the two retaining blocks come close to each other and thus are disengaged from the two hooks, thereby allowing the movable member to freely slide along the two main poles to change the extension distance. The spring member accumulates the elastic potential energy while the external force is applied, and releases the accumulated elastic potential energy to return the pressing block and the two retaining blocks once the external force is removed.

Preferably, each of the two retaining blocks has one end being provided with a moving end and another end being provided with a hooking end, in which the two moving ends of the two retaining blocks each have a respective one of the ramp portions, and the two hooking ends of the two retaining blocks each are configured to be engaged with a respective one of the two hooks; the spring member includes a first spring member arranged between the two moving ends of the two retaining blocks.

Preferably, the spring member comprises a first spring member and a second spring member, in which the first spring member is arranged between the two retaining blocks, and the second spring member is arranged in the transverse plate and pressed against the pressing block.

Preferably, the two ramp portions each have an incline in contact with a respective one of the two lateral sides of the receiving groove; and when being applied with the external force, the pressing block moves downward along and pushes against the two inclines of the two ramp portions, so that the two retaining blocks come close to each other and compress the first spring member arranged therebetween.

Preferably, the carrying platform further comprises an operating rod, two roller sets, and a base; the operating rod has two ends each being pivotally connected to a respective one of the two main poles; each of the two ends of the operating rod is provided with a first gear wheel adjacent to a position where a corresponding main poles is pivotally connected thereto; the two main poles each are provided with a second gear wheel engaged perpendicularly with a respective one of the two first gear wheels; and the two roller sets each are provided with a third gear wheel engaged horizontally with a respective one of the two second gear wheels, so that the two roller sets is able to be retracted or expanded in a horizontal direction when the two first gear wheels are driven by the operating rod to move the two second gear wheels and in turn rotate the two third gear wheels.

Preferably, the two roller sets each have a fixing recess, and the two ends of the operating rod each are further provided with a protruding member so that, when the operating rod expand in the horizontal direction, the protruding members are inserted into the two fixing recesses.

Preferably, the two roller sets are further provided with two fourth gear wheels, and the base has two ends with a fifth gear wheel pivotally connected to each end; each said fourth gear wheel is vertically aligned and coaxial with the corresponding third gear wheel and is vertically engaged with a respective one of the two fifth gear wheels so that, when the third gear wheels is driven to rotate the fourth gear wheels, the fifth gear wheels drive the base to fold toward the two main poles, or to deploy away from the two main poles.

Accordingly, the following benefits can be achieved:

1. With the movable member sliding along the two main poles, the pull rod can be set at a proper height that facilitates a user's walking and pulling the trolley.

2. When not in use, the trolley can have the pull rod shortened to the minimum length, and with other folding means that folds the trolley to its most compact dimensions, the storage of the trolley is convenient.

3. The disclosed folding structure is structurally simple, and thus is easy to assemble and maintain.

4. The two roller sets of the disclosed folding structure is allowed to be retracted or expanded in the horizontal direction by means of the engagement and motional link among the first gear wheels, the second gear wheels, and the third gear wheels, thereby facilitating storage.

5. When the operating rod expands in the horizontal direction, the protruding members of the operating rod are inserted in the fixing recesses. Thereby, during the use of the trolley for carrying loads, two roller sets are secured from accidentally getting collapsed in the horizontal direction due to overload or wheel hop, thus improving safety in use.

6. With the engagement and motional link among the first gear wheels, the second gear wheels, the third gear wheels, the fourth gear wheels, and the fifth gear wheels of the disclosed folding structure, the base can be folded toward the two main poles. Thus, the trolley when not in use can be easily store without occupying excessive space.

BRIEF DESCRIPTION OF THE DRAWINGS

FIG. 6 is a perspective view of the trolley in FIG. 1 with its pull rod collapsed into a minimal length.

DETAILED DESCRIPTION OF THE INVENTION

Figure 1:
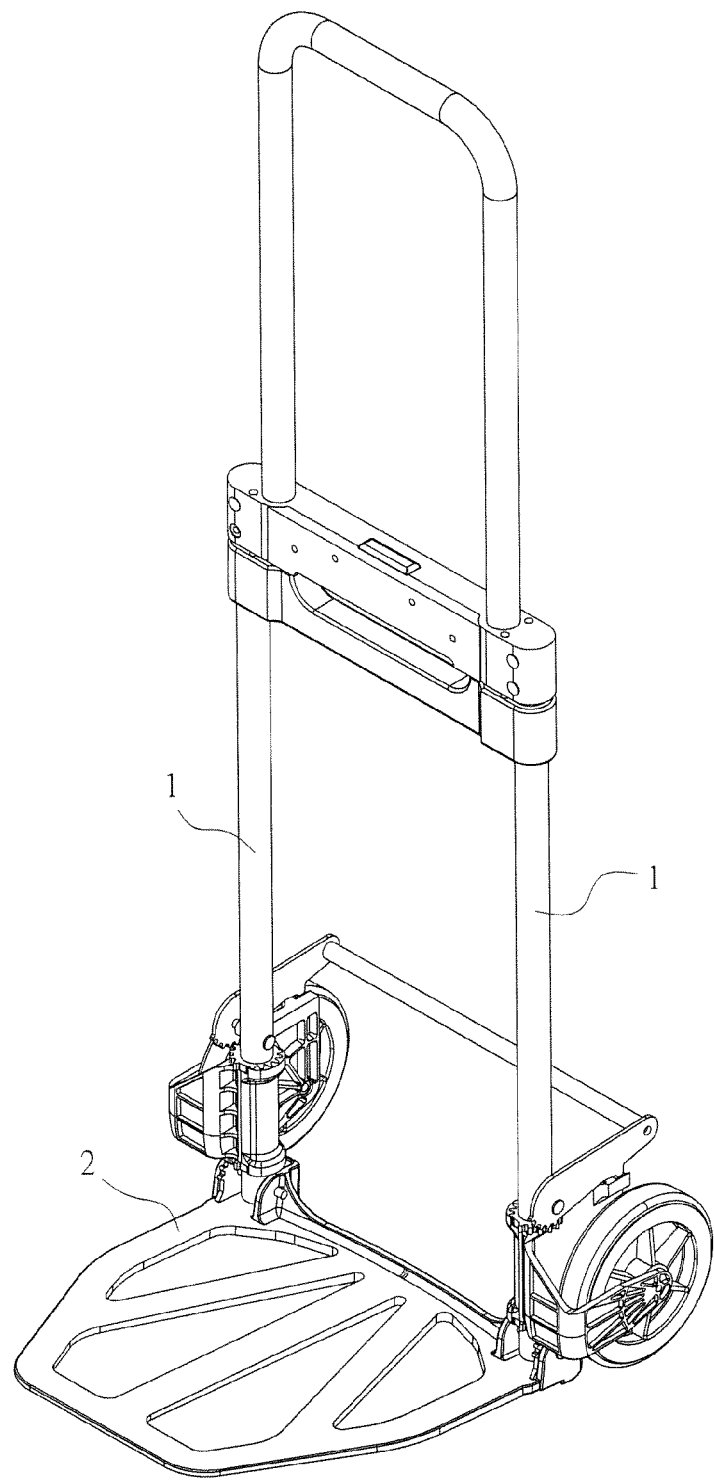
FIG. 1 is a perspective view of a trolley according to one embodiment of the present invention.

With the aforementioned technical features, the folding structure for a trolley according to the present invention provides benefits as manifested in the following embodiments.

It is to be noted that, throughout the embodiments shown in the accompanying drawings, all expressions of directions (i.e. up, down, right, left, font and back) when referred to constructions and motions of the components of the present invention are relative but not absolute. The description made herein is relevant when these components are located as shown in the drawings. When these components are arranged otherwise, the expressions of directions change accordingly.

Referring to FIG. 1, while an entire trolley is depicted, the present invention is particularly focused on a folding structure applied to the trolley. The folding structure comprises two main poles (1). The two main poles (1) are separated by a preset distance and have their lower ends jointly connected to a carrying platform (2) that is used to carry and move articles. Now referring to FIG. 2 and FIG. 3, a transverse plate (3) is connected to upper ends of the two main poles (1). The transverse plate (3) has a first casing (31), a second casing (32), a pressing block (33), two retaining blocks (34), and a first spring member (35). The first casing (31) contains a plurality of receiving spaces (37), and the second casing (32) is combined with the first casing (31) so as to cover the receiving spaces (37).

More specifically, the receiving spaces (37) include a first space (371), a second space (372), and two third spaces (373). The first space (371) is communicated with an opening (311) of the first casing (31) and extends downward to communicate with the second space (372). The second space (372) runs horizontally and is communicated with the third spaces (373). The two third spaces (373) are forms at two ends of the first casing (31), respectively.

The pressing block (33) is installed in the first space (371) with a part thereof exposed at the opening (311) for a user to push. The pressing block (33) has a receiving groove (331) facing the second space (372). Preferably, for a user's convenient pushing the pressing block (33), two second spring members (36) are installed in the first space (371) and pressed against the pressing block (33). The second spring members (36) accumulate or release an elastic potential energy in response to movement of the pressing block (33) relative to the retaining blocks (34).

The two retaining blocks (34) are fitted in the horizontal second space (372). Each of the two retaining blocks (34) has one end being provided with a moving end (341) and another end being provided with a hooking end (342). The moving end (341) of each retaining block (341) is provided with a ramp portion (3411). In the present embodiment, the ramp portion (3411) is a triangular portion, but not limited thereto, as long as the ramp portion (3411) has an incline. The two retaining blocks (34) are such fitted into the second space (372) that the two ramp portions (3411) face each other. In addition, the first spring member (35) is arranged between the two retaining blocks (34), and the ramp portions (3411) of the two retaining blocks (34) each have a part in contact with two lateral sides of the receiving groove (331) of the pressing block (33). The first spring member (35) accumulates or releases an elastic potential energy in response to movement of the pressing block (33) relative to the two retaining blocks (34).

Figure 2:
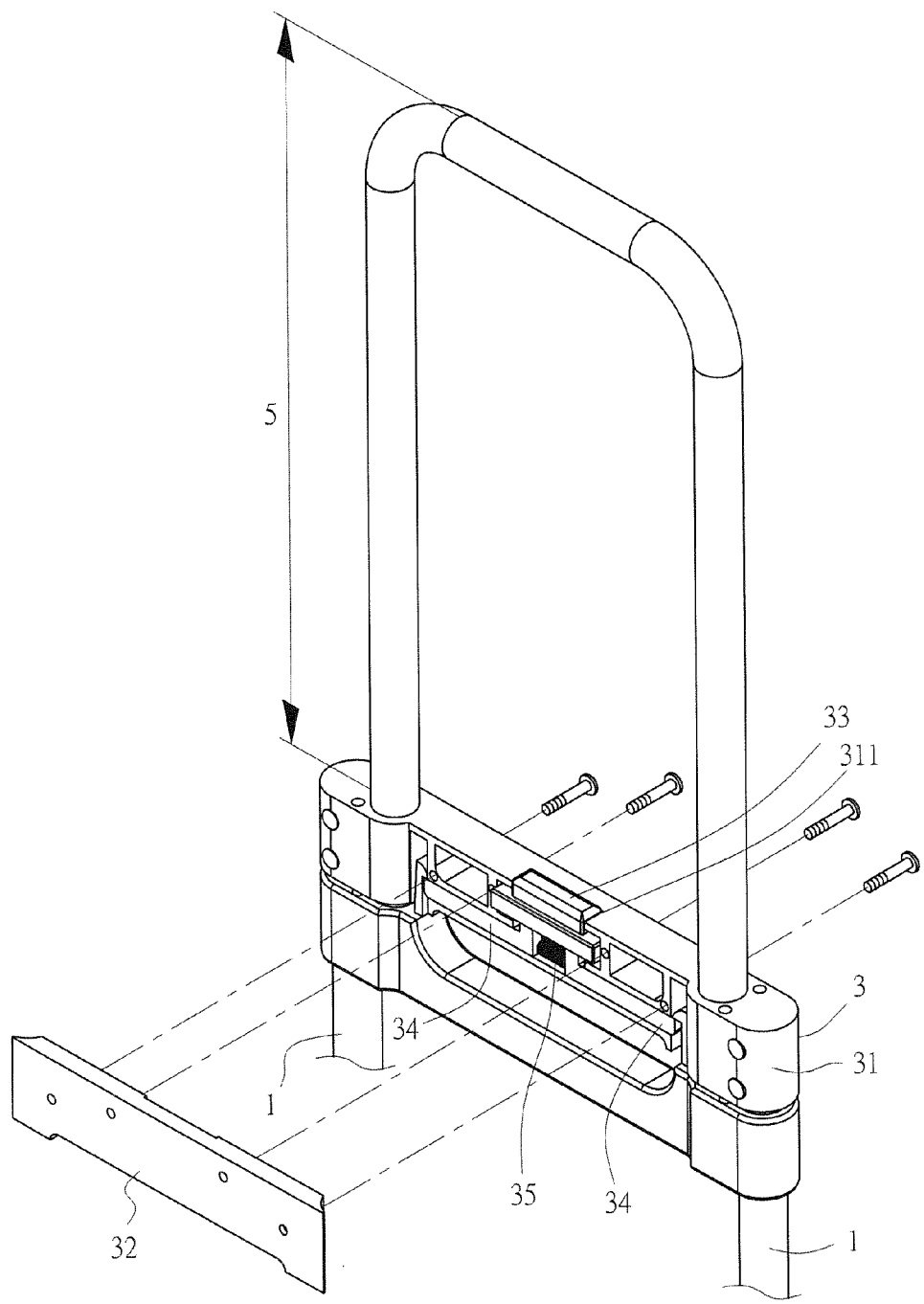
FIG. 2 is a schematic drawing of a folding structure on the trolley in FIG. 1.
Figure 3:
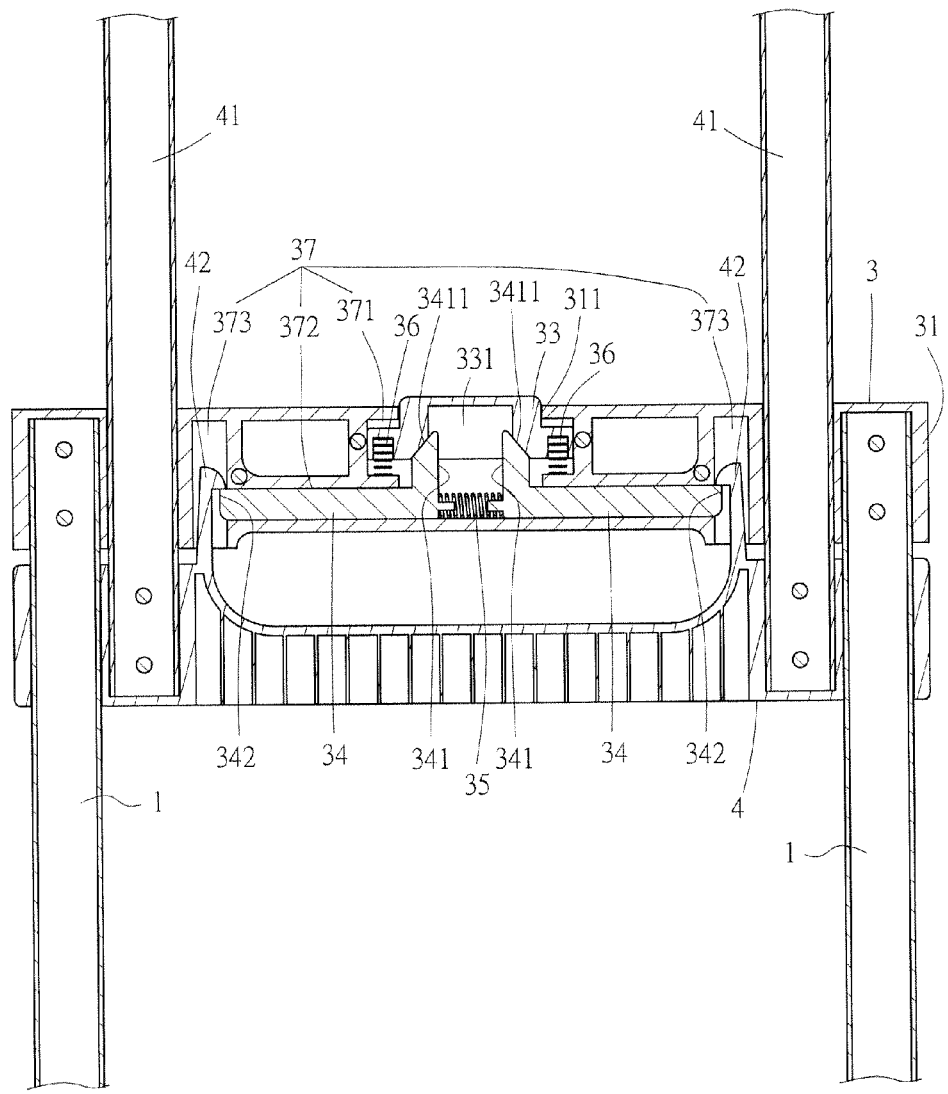
FIG. 3 is a partially cross-sectional view of the folding structure in FIG. 2.

As shown in FIG. 3, a movable member (4) is provided below the transverse plate (3) and is slidably mounted around the two main poles (1). The movable member (4) further comprises a pull rod (41). The pull rod (41) extends through the transverse plate (3) and has a portion going beyond the transverse plate (3). The portion of the pull rod (41) that goes beyond the transverse plate (3) has a length defined as an extension distance (5) (see FIG. 2). In the present embodiment, the pull rod (41) has a U-like shape with two arms extending through the transverse plate (3). When the movable member (4) moves along the two main poles (1), the extension distance (5) changes with the relative position between the movable member (4) and the transverse plate (3), as shown in FIG. 2. In other words, the closer the movable member (4) and the transverse plate (3) are, the greater the length of the pull rod (41) going beyond the transverse plate (3) is. On the contrary, the farther the movable member (4) and the transverse plate (3) are, the smaller the length of the pull rod (41) going beyond the transverse plate (3) is. More specifically, the movable member (4) has two hooks (42) extending therefrom and being located between the arms of the U-shaped pull rod (41). When the movable member (4) comes to the transverse plate (3), the two hooks (42) each engage with one of the two retaining blocks, thereby making the movable member (4) motionally linked with the transverse plate (3). Moreover, when the two hooks (42) each engage with one of the two retaining blocks (34), the length of the pull rod (41) going beyond the transverse plate (3) reaches its maximum.

In use, referring to FIG. 3, the pull rod (41) can be set at a proper height for a user's convenience of pulling the trolley. For example, when a user in a standing posture wants to move articles with the trolley, the movable member (4) is moved toward the transverse plate (3) and reaches a such position that the two hooks (42) each engage with one of the two retaining blocks (34) (as shown in FIG. 3), allowing the movable member (4) and the transverse plate (3) to get positioned with respect to each other so that the user can pull the trolley with ease.

Figure 4:
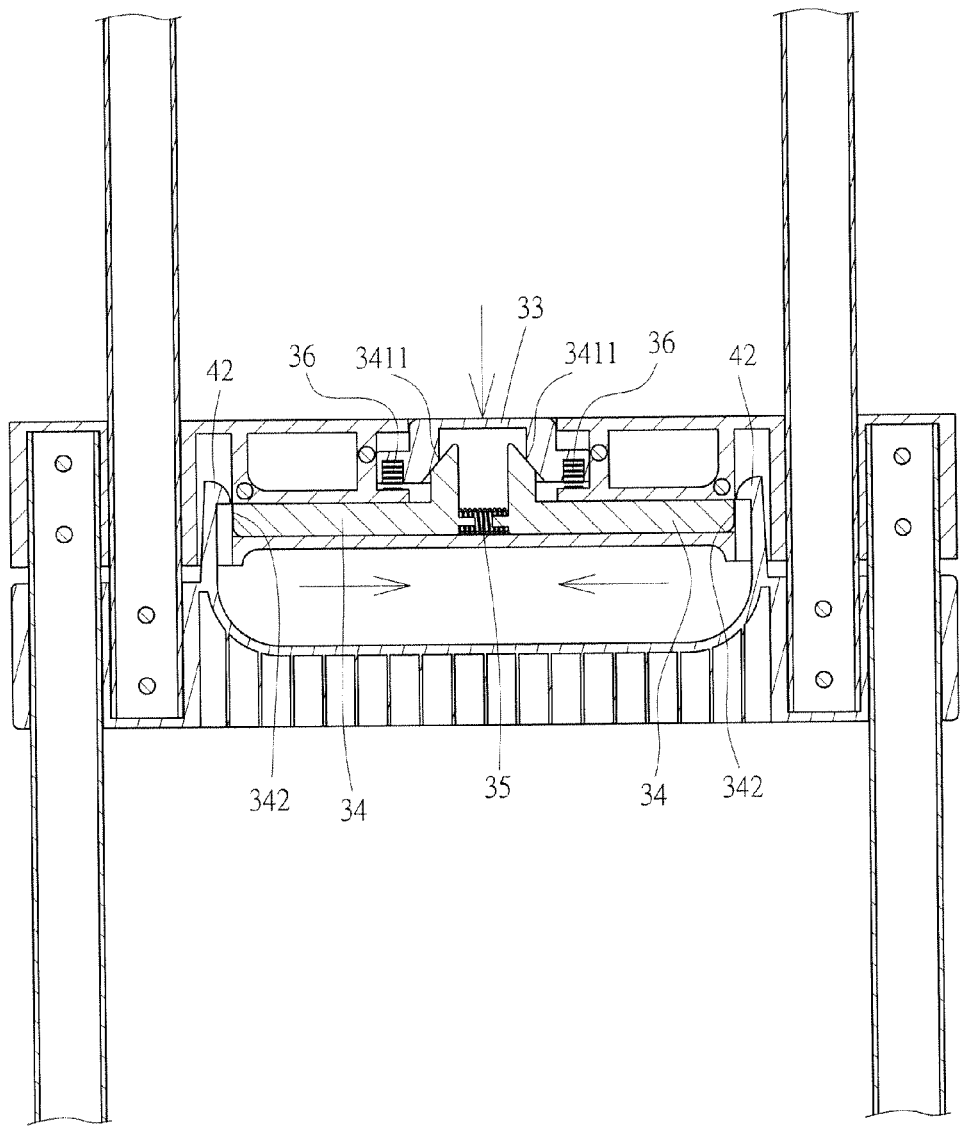
FIG. 4 is another partially cross-sectional, schematically showing the operation of the folding structure in FIG. 3.
Figure 5:
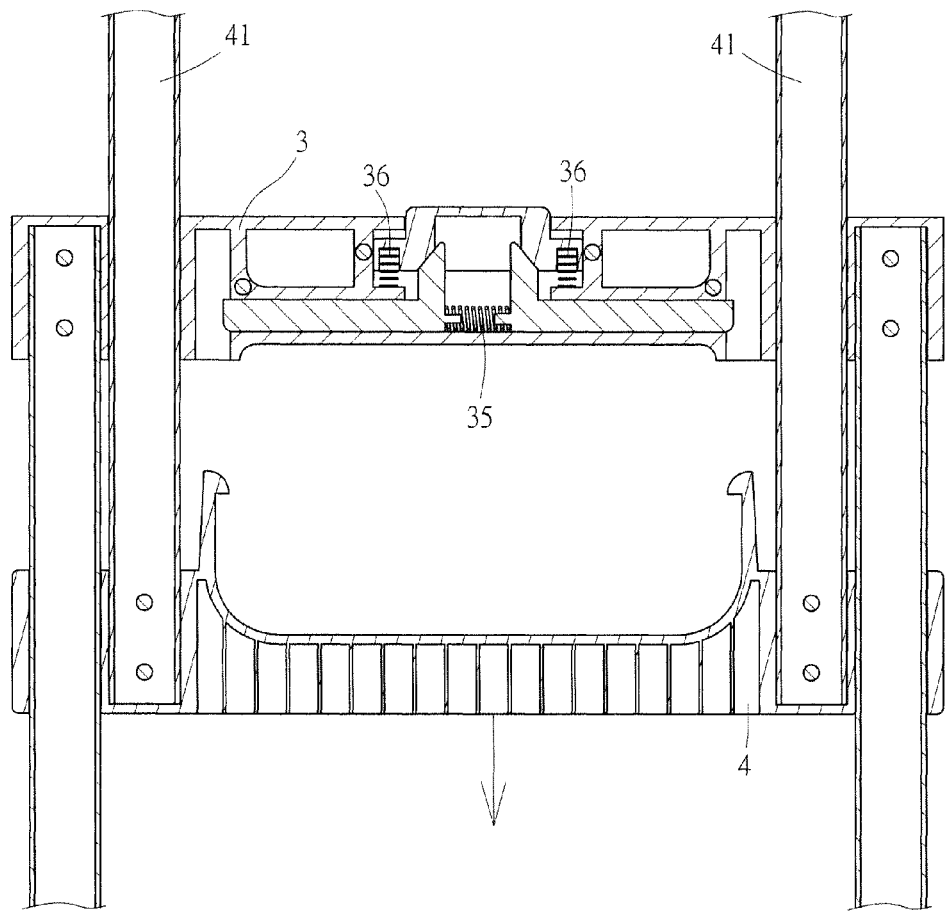
FIG. 5 is still another partially cross-sectional view, schematically showing further operation of the folding structure in FIG. 4.

Further referring to FIG. 4, after use of the trolley, the user may apply an external force to press the pressing block (33) so that the pressing block (33) moves downward along and pushes against the inclines of the ramp portions (3411) of the two retaining blocks (34). As a result, the two retaining blocks (34) come close to each other and eventually have their respective hooking ends (342) disengaged from the two hooks (42). Now referring to FIG. 5, once the retaining blocks (34) are separated from the hooks (42), the user is allowed to slide the movable member (4) downward and thus adjust the length of the pull rod (41) going beyond the transverse plate (3) to its minimum, thereby achieving quick folding. In more detail, the first spring member (35) and the second spring members (36) accumulate the elastic potential energy until the external force applied by the user is removed, and once the external force is removed, the first spring member (35) and the second spring members (36) release the accumulated elastic potential energy to return the pressing block (33) and the two retaining blocks (34). FIG. 6 is a perspective view of the trolley with its pull rod collapsed into a minimal length.

Figure 7:
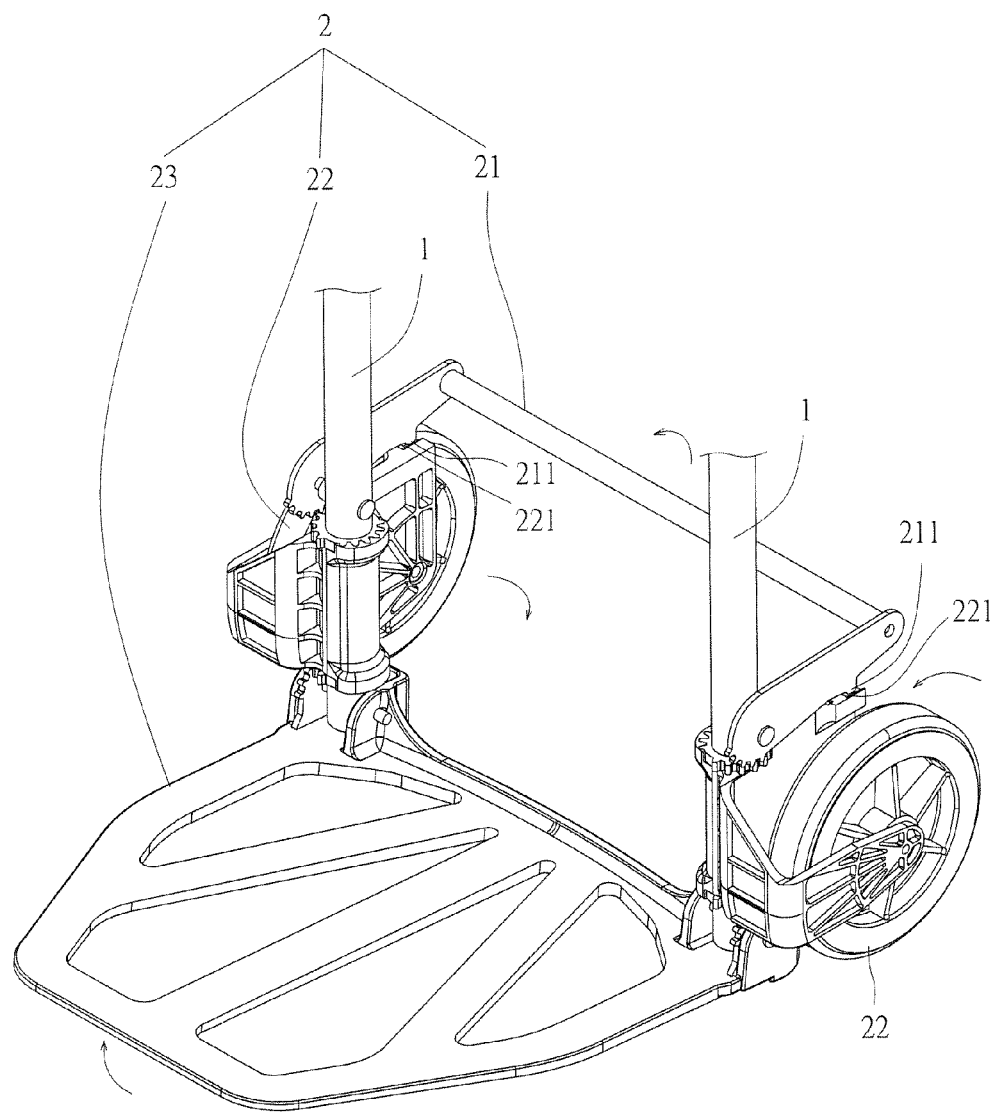
FIG. 7 is a schematic drawing of a carrying platform on the trolley in FIG.

FIG. 7 illustrates the two main poles (1) and the carrying platform (2) connected thereto. The carrying platform (2) comprises an operating rod (21), two roller sets (22), and a base (23). Further referring to FIG. 8, in which only one side of the carrying platform (2) is shown, while both sides of the carrying platform (2) are configured symmetrically. The operating rod (21) has two ends each being pivotally connected to a respective one of the two main poles (1). Each of the two ends of the operating rod (21) is provided with a first gear wheel (24) adjacent to a position where the corresponding main pole (1) is pivotally connected thereto. The two main poles (1) each are provided with a second gear wheel (25) engaged perpendicularly with a respective one of the two first gear wheels (24). In addition, the two roller sets (22) each are provided with a third gear wheel (26) engaged horizontally with a respective one of the two second gear wheel (25). The motional relation among the two first gear wheels (24), the two second gear wheels (25), and the two third gear wheels (26) is now described with reference to FIG. 7 and FIG. 8. When the operating rod (21) moves upward, the two first gear wheels (24) rotate anticlockwise and thus drive the two second gear wheels (25) to rotate anticlockwise, and consequently, the two third gear wheels (26) are driven to rotate horizontally, making the two roller sets (22) folded horizontally. On the contrary, to expand the two roller sets (22) for use, the operating rod (21) is first pressed downward to make the two first gear wheels (24) rotate clockwise, which in turn drives the two second gear wheels (25) to rotate clockwise, and consequently, the two third gear wheels (26) are driven to perform a horizontal, anticlockwise rotation, thereby making the two roller sets (22) expand horizontally.

Figure 8:
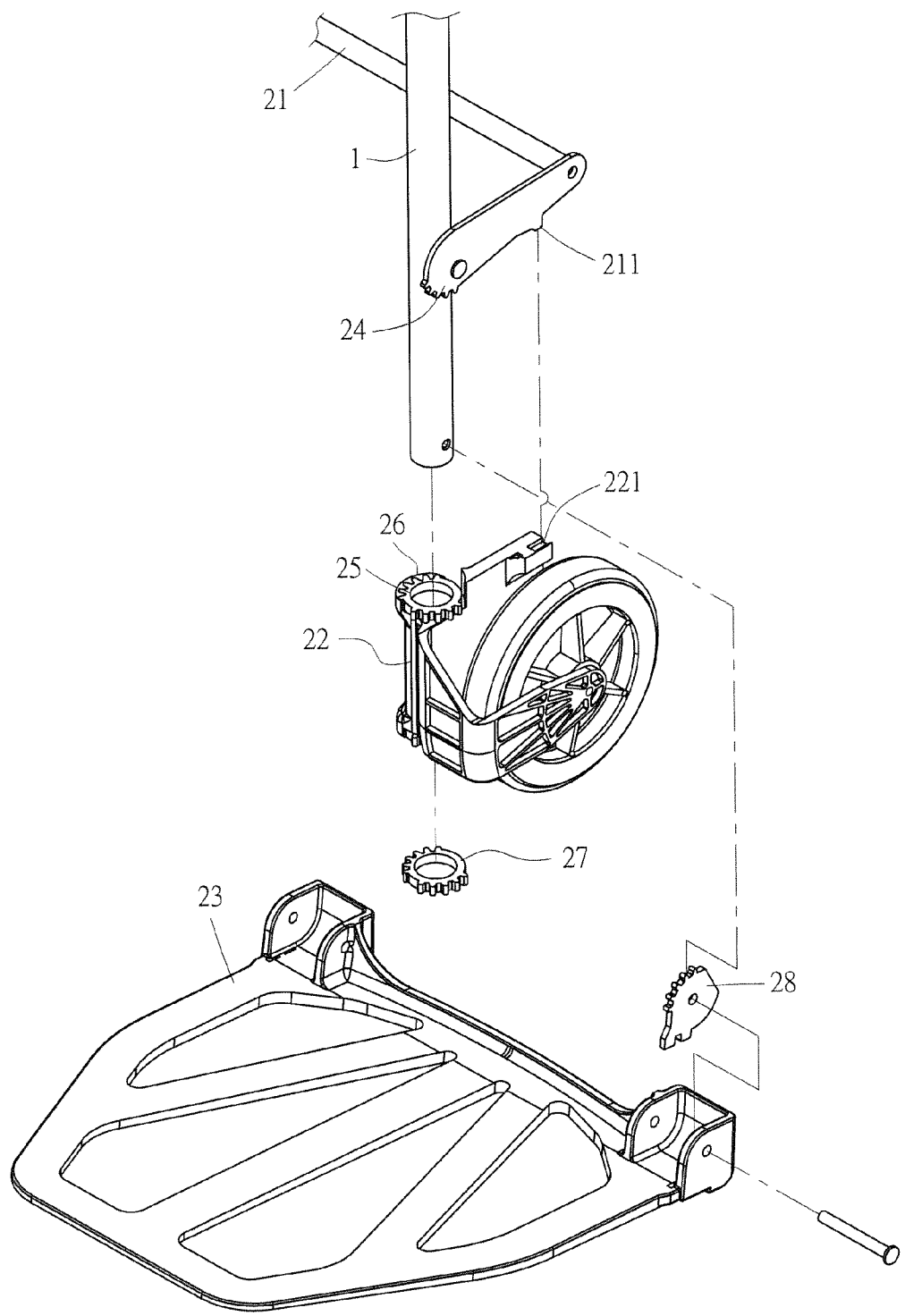
FIG. 8 is a partially exploded view of the carrying platform in FIG. 7.

It is to be noted that, as shown in FIG. 7 and FIG. 8, the two roller sets (22) are each provided with a fixing recess (221), and the two ends of the operating rod (21) each are further provided with a protruding member (211). When the operating rod (21) expands in the horizontal direction, the two protruding members (211) can be inserted into the two fixing recesses (221). Thereby, during the use of the trolley for carrying loads, two roller sets (22) are secured from accidentally getting collapsed in the horizontal direction due to overload or wheel hop, thus improving safety in use.

Figure 9:
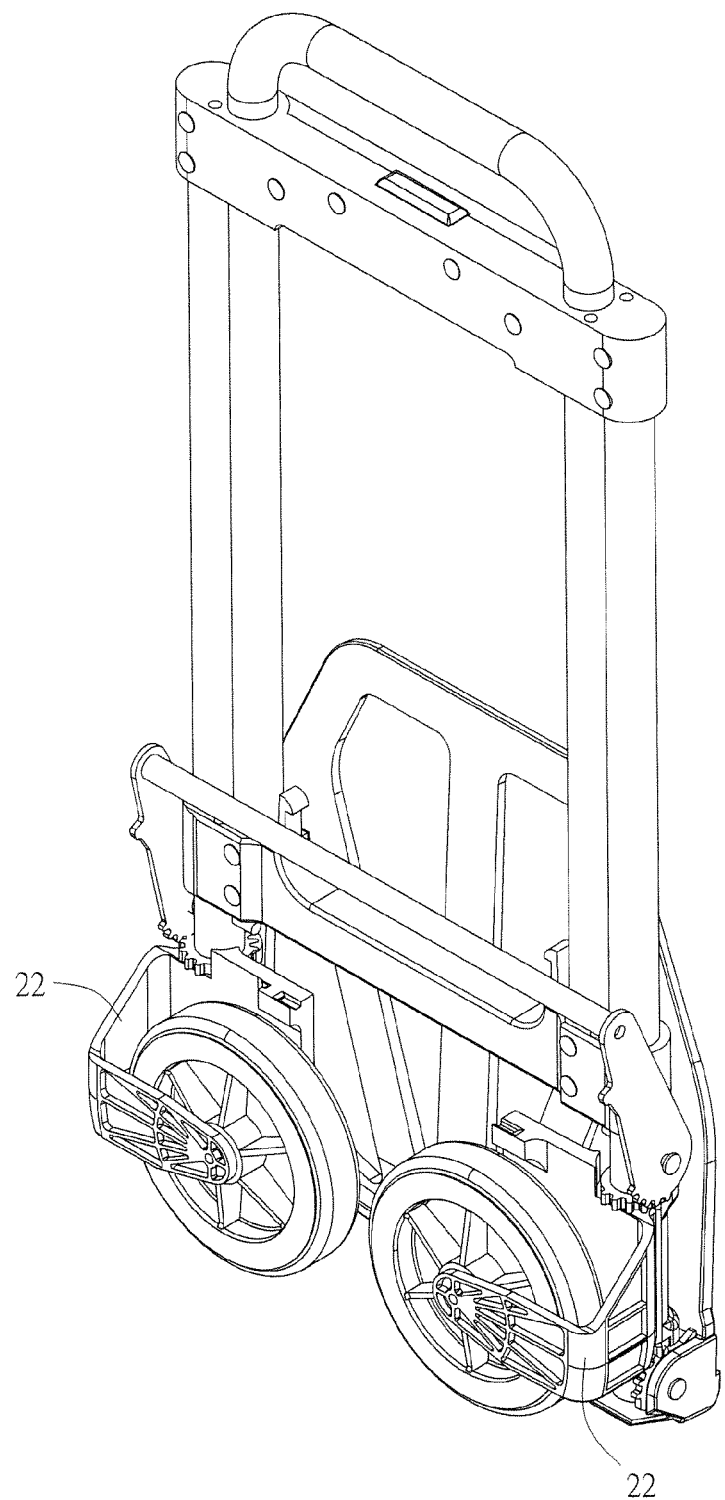
FIG. 9 is a perspective view of the trolley in FIG. 1 folded to its most compact dimensions.
Figure 10:
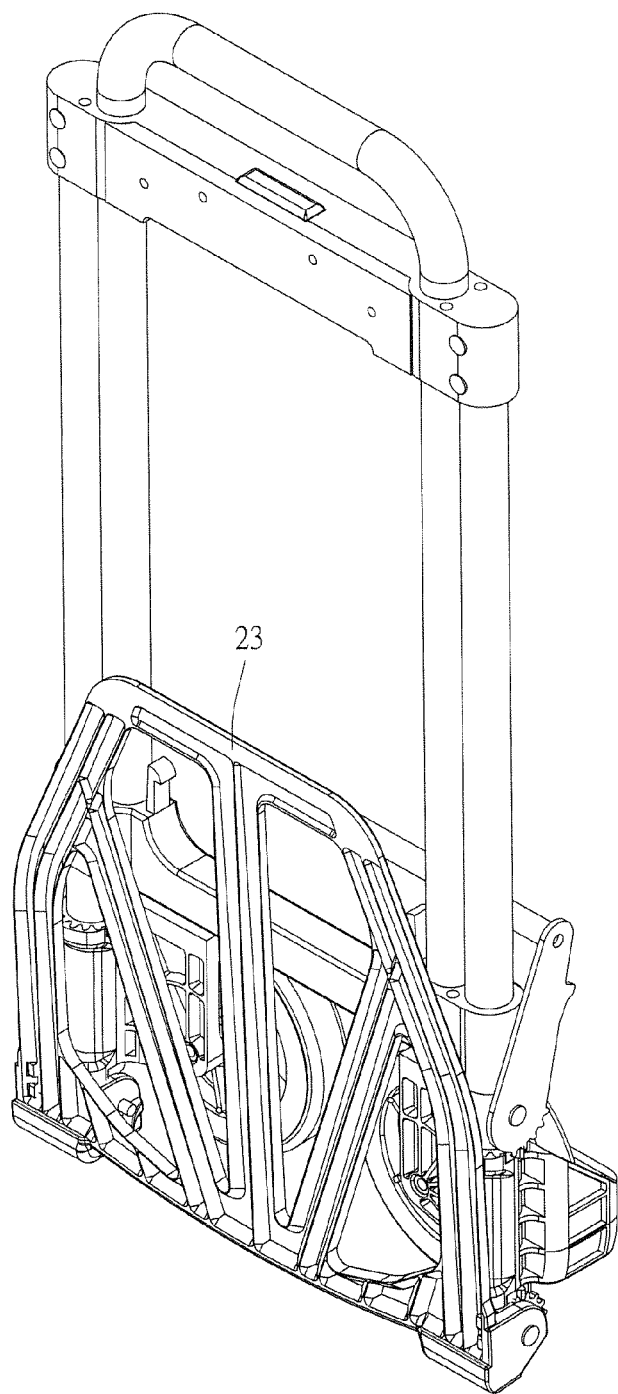
FIG. 10 is another perspective view of the trolley in FIG. 1 in the most compact state.

Furthermore, the two roller sets (22) are further provided with two fourth gear wheels (27). Each of the two fourth gear wheels (27) is vertically aligned and coaxial with the corresponding third gear wheel (26). The base (23) has two ends with a fifth gear wheel (28) pivotally connected to each end. Each of the fourth gear wheel (27) is engaged perpendicularly with a respective one of the two fifth gear wheels (28). While the two third gear wheels (26) are moved with the operating rod (21) being lifted upward, the two fourth gear wheels (27) are rotated and in turn drive the two fifth gear wheels (28) to rotate clockwise, thereby allowing the base (23) to be folded upward. Therefore, the trolley can be folded to its most compact dimensions. FIG. 9 and FIG. 10 show the trolley being folded to its most compact dimensions from different viewpoints. FIG. 9 clearly shows the two roller sets (22) folded, and FIG. 10 clearly shows the base (23) folded.

Referring back to FIG. 7, on the contrary, while the two third gear wheels (26) are moved with the operating rod (21) being pressed downward, the two fourth gear wheels (27) are rotated and thus drive the two fifth gear wheels (28) to rotate anticlockwise, making the base (23) deployed downward and expanding for carrying articles.

The present invention has been described with reference to the preferred embodiments and it is understood that the embodiments are not intended to limit the scope of the present invention. Moreover, as the contents disclosed herein should be readily understood and can be implemented by a person skilled in the art, all equivalent changes or modifications which do not depart from the concept of the present invention should be encompassed by the appended claims.

What is claimed is:

1. A folding structure for a trolley, the folding structure comprising:

at least two main poles that are spaced apart from each other by a preset distance, wherein a carrying platform and a transverse plate are separately mounted with the two main poles; and the transverse plate is provided with a pressing block, two retaining blocks, and a spring member, in which the pressing block has a receiving groove, the two retaining blocks each have one end provided with a ramp portion in contact with a respective one of two lateral sides of the receiving groove, and the spring member accumulates or releases an elastic potential energy in response to relative movement among the pressing block and the two retaining blocks; and a movable member located below the transverse plate and slidably mounted around the two main poles, wherein the movable member has two hooks extending therefrom and being configured to engage with the two retaining blocks; the movable member has a pull rod extending through the transverse plate and having a portion going beyond the transverse plate; and the portion of the pull rod that goes beyond the transverse plate has a length defined as an extension distance;

wherein when the two hooks of the movable member each engage with a respective one of the two retaining blocks, the extension distance is at its maximum;

wherein while, with the two hooks of the movable member each engaging with a respective one of the two retaining blocks, being applied with an external force, the pressing block presses against the ramp portions of the two retaining blocks so that the two retaining blocks come close to each other and thus are disengaged from the two hooks, thereby allowing the movable member to freely slide along the two main poles to change the extension distance;

wherein the spring member accumulates the elastic potential energy while the external force is applied; and wherein the spring member releases the elastic potential energy to return the pressing block and the two retaining blocks once the external force is removed.

2. The folding structure of claim 1, wherein each of the two retaining blocks has one end being provided with a moving end and another end being provided with a hooking end, in which the two moving ends of the two retaining blocks each have a respective one of the ramp portions, and the two hooking ends of the two retaining blocks each are configured to be engaged with a respective one of the two hooks; and the spring member includes a first spring member arranged between the two moving ends of the two retaining blocks.

3. The folding structure of claim 1, wherein the spring member comprises a first spring member and a second spring member, in which the first spring member is arranged between the two retaining blocks, and the second spring member is arranged in the transverse plate and pressed against the pressing block.

4. The folding structure of claim 3, wherein the two ramp portions each have an incline in contact with said respective one of the two lateral sides of the receiving groove; and when being applied with the external force, the pressing block moves downward along and pushes against the two inclines of the two ramp portions, so that the two retaining blocks come close to each other and compress the first spring member arranged therebetween.

5. The folding structure of claim 1, wherein the carrying platform further comprises an operating rod, two roller sets, and a base; the operating rod has two ends each being pivotally connected to a respective one of the two main poles; each of the two ends of the operating rod is provided with a first gear wheel adjacent to a position where a corresponding main pole is pivotally connected thereto; the two main poles each are provided with a second gear wheel engaged perpendicularly with a respective one of the two first gear wheels; and the two roller sets each are provided with a third gear wheel engaged horizontally with a respective one of the two second gear wheels, so that the two roller sets is able to be retracted or expanded in a horizontal direction when the two first gear wheels are driven by the operating rod to move the two second gear wheels and in turn rotate the two third gear wheels.

6. The folding structure of claim 5, wherein the two roller sets each have a fixing recess, and the two ends of the operating rod each are further provided with a protruding member so that, when the operating rod expand in the horizontal direction, the protruding members are inserted into the two fixing recesses.

7. The folding structure of claim 5, wherein the two roller sets are further provided with two fourth gear wheels, and the base has two ends with a fifth gear wheel pivotally connected to each end; and each said fourth gear wheel is vertically aligned and coaxial with a corresponding third gear wheel and is engaged perpendicularly with a respective one of the two fifth gear wheels so that, when the third gear wheels is driven to rotate the fourth gear wheels, the fifth gear wheels drive the base to fold toward the two main poles, or to deploy away from the two main poles.

* * * * *